(12) United States Patent
Stott et al.

(10) Patent No.: US 6,240,146 B1
(45) Date of Patent: May 29, 2001

(54) DEMODULATING DIGITAL VIDEO BROADCAST SIGNALS

(75) Inventors: Jonathan Highton Stott, Horley; Justin David Mitchell; Christopher Keith Perry Clarke, both of Crawley; Adrian Paul Robinson, London; Oliver Paul Haffenden, Tadworth, all of (GB); Philippe Sadot, Ville d'Avray (FR); Lauret Regis, Sonchamp (FR); Jean-Marc Guyot, Paris (FR)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/071,575

(22) Filed: May 1, 1998

Related U.S. Application Data

(60) Provisional application No. 60/054,195, filed on Jul. 30, 1997.

(30) Foreign Application Priority Data

| | | |
|---|---|---|
| May 2, 1997 | (GB) | 9709063 |
| Dec. 22, 1997 | (GB) | 9727112 |
| Dec. 22, 1997 | (GB) | 9727113 |
| Apr. 27, 1998 | (GB) | 9808992 |

(51) Int. Cl.[7] .................................................. H04L 27/06
(52) U.S. Cl. ........................ 375/344; 375/340; 375/147
(58) Field of Search .................................... 375/147, 316, 375/340, 344; 329/315, 316; 348/553, 725, 726

(56) References Cited

U.S. PATENT DOCUMENTS

| | | | | |
|---|---|---|---|---|
| 5,506,636 | * | 4/1996 | Patel et al. ............................. | 348/725 |
| 5,715,012 | * | 2/1998 | Patel et al. ............................. | 348/555 |
| 5,920,598 | * | 7/1999 | Hyakudai et al. ..................... | 375/316 |
| 5,966,188 | * | 10/1999 | Patel et al. ............................. | 348/726 |

* cited by examiner

Primary Examiner—Stephen Chin
Assistant Examiner—Lenny Jiang

(57) ABSTRACT

An apparatus for demodulating a digital video broadcast signal comprising data modulated on a multiplicity of spaced carrier frequencies. A transform device may analyze the digital broadcast signal to provide a series of symbol values for each of the multiplicity of carrier frequencies. An automatic frequency control device may control the frequency of the series of symbol values in dependence on a common phase error signal from the series of symbol values. First and second common phase error correction (CPE) devices may receive common phase error signals, for correcting the signal values from the transform device. A channel equalization device may compensate for communication channel impairments for receiving directly the phase error corrected signals from the first CPE device.

20 Claims, 3 Drawing Sheets

ARCHITECTURE OF THE DTTV INTERGRATED CIRCUIT

DEMODULATING DIGITAL VIDEO BROADCAST SIGNALS

This application is a provisional of 60/054,195, filed Jul. 30, 1997.

This invention relates to demodulating digital video broadcast (DVB) signals.

There are currently two major types of DVB, namely, terrestrial broadcasting and satellite/cable broadcasting. The invention is particularly, though not exclusively concerned with terrestrial broadcasting, which has special problems, particularly in communication channel impairment, arising from adjacent television channels, multipath, and co-channel interference, for example. A type of transmission which has been developed to meet these problems is known as Coded Orthogonal Frequency Division Multiplexing (COFDM)—see for example "Explaining Some of the Magic of COFDM" Stott, J. H.—Proceedings of 20th International Television Symposium, Montreux, June 1997. In COFDM, transmitted data is transmitted over a large number of carrier frequencies (1705 or 6817 for DVB), spaced (by the inverse of the active symbol period) so as to be orthogonal with each other; the data is convolutionally coded, to enable soft-decision (Viterbi) decoding. Metrics for COFDM include Channel State Information (CSI) which represents the degree of confidence in each carrier for reliably transmitting data.

Modulation and Demodulation of the carriers may be carried out by a Fast Fourier Transform (FFT) algorithm performing Discrete Fourier Transform operations. Naturally, various practical problems arise in demodulation in a receiver, firstly in down-converting the transmitted signal in a tuner to a frequency at which demodulation can be carried out, and secondly by accurately demodulating the data from a large number of carriers in a demodulator which is not overly complex or expensive.

In the receiver, frequency offsets may appear after the tuner down-conversation due to oscillator tolerance. Such frequency offset is lethal for signal recovery and frequency has therefore to be tracked by Automatic Frequency Control (AFC). In addition, oscillator phase noise introduces a so-called Common Phase Error (CPE) term, which is a phase offset all carriers bear, and that varies randomly from symbol to symbol. This effect has also to be compensated. Finally, the channel response may not be flat, due to echoes, interferers, and a Channel Equalizer is required to correct for such channel imperfections.

An important consideration in designing a demodulator for incorporation in an integrated circuit chip is reducing the requirements for memory. Bearing in mind the chip may only contain about 1 M Bit of memory, and that signal values for up to about 7000 carrier frequencies may be processed in the chip, this requires tight control over the use of available memory. Certain operations such as Fourier transformation and symbol interleaving require fixed amounts of memory (about 50% of the total). However, other operations such as timing synchronization, common phase error (CPE) correction, and Channel Equalization (CE) require some memory but the amount of memory is not fixed.

SUMMARY OF THE INVENTION

Accordingly, the present invention provides an apparatus for demodulating a digital video broadcast signal comprising data modulated on a multiplicity of spaced carrier frequencies, the apparatus including:

transform means for analyzing the broadcast signal to provide a series of symbol values for each of the multiplicity of carrier frequencies, automatic frequency control means for controlling the frequency of said series of signal values in dependence on a common phase error signal from said series of symbol values, first and second delay means coupled in series to receive said series of symbol values from said transform means, and means for deriving from symbol values in the first and second delay means a common phase error signal, first and second common phase error correction (CPE) means for receiving said common phase error signal, for correcting said symbol values from said transform means, the output of the first delay means being applied to the first CPE means and the output of the second delay means being applied to said second CPE means, channel equalization means for compensating for communication channel impairments for receiving directly the phase error corrected signals from said first CPE means, and third and fourth delay means connected in series and connected to receive the output from said second CPE means and applying delayed versions of the same to the channel equalization means.

In a more specific aspect, the invention provides apparatus for demodulating digital video broadcast signals comprising data modulated on a multiplicity of spaced carrier frequencies, including:

down-conversion means for converting an input broadcast signal to a frequency sufficiently low to enable analog to digital conversion of the signal;

analog to digital conversion means for converting the broadcast signal to a series of digital samples, real to complex conversion means for converting each digital sample to a complex number value, Fourier Transform means for analyzing the complex number values to provide a series of symbol values for each carrier frequency, frequency control means, comprising means responsive to the output of said Fourier Transform means for producing a signal for controlling the frequency of the signal formed by said complex number values, wherein the frequency control means derives a common phase error signal from said series of symbol values, first and second delay means coupled in series to receive said series of symbol values from said transform means, and for providing delayed versions to said automatic frequency control means, first and second common phase error correction (CPE) means for receiving said common phase error signal, for correcting said symbol values from said transform means, the output of the first delay means being applied to the first CPE means and the output of the second delay means being applied to said second CPE means, channel equalization means for compensating for communication channel impairments for receiving directly the phase error corrected signals from said first CPE means, and third and fourth delay means connected in series and connected to receive the output from said second CPE means and applying delayed versions of the same to the channel equalization means.

In accordance with the invention, the input broadcast signal which is normally a UHF signal, say 700 MHz, is down converted, preferably in two stages, firstly to about 30–40 MHz and secondly to about 4.5 MHz. Since the bandwidth of the signal is about 7.6 MHz, an IF frequency of 4.5 MHZ represents essentially a DC or base band signal which can then be sampled by means of an analog to digital converter. Subsequent to analog to digital conversion, the sampled signal is converted to complex number values, in order to represent a true DC signal centred on 0 Hz. This facilitates the operation of the Fourier transform device which as mentioned above is normally an FFT performing a DFT on each carrier signal. The result of the transform is a series of data symbol values for the symbols encoded on each carrier wave.

The data is processed, principally for channel equalization and for weighting the contribution of each channel by the derived Channel State Information.

Another signal processing employed is correction for common phase error. As will become clear below, phase error in COFDM signals is present in two components, a random component and a component which is common to all carriers, arising from local oscillator phase noise. Such common phase error may be removed by a technique as described in more detail below.

The process of demodulation requires very accurate tracking of the input signal and to this end automatic frequency control and timing control are desirable. Timing control is necessary in order to ensure that the timing window for the FFT is correctly positioned in relation to the input waveforms. Thus, the sampling by the ADC must be synchronized with the input wave forms. For an input signal centred on 4.57 MHz, an ADC operating frequency of 18.29 MHz (4.57×4) is preferred. The ADC is maintained in synchronization by a loop control wherein the complex signal value at the input of the FFT is applied to a time synchronization unit whose output is converted in a digital to analog converter (DAC) to an analog value, which is employed to control a voltage controlled oscillator providing a clock signal to the ADC.

Automatic frequency control (AFC) is necessary to maintain the demodulation process in synchronization with down-conversion, otherwise a gradually increasing phase error occurs in the recovered signals. To this end, a signal derived subsequent to the FFT, from the demodulated signals may be fed back to the local oscillator for IF generation in order to maintain frequency synchronization. However, such control has disadvantages of complication in that a control signal must be fed back to the IF generation means and the control signal must adjust the reference crystal within the search range of the AFC. As an alternative therefore, AFC may be provided as a digital control applied to a digital frequency shifter coupled the input of the FFT device. The process of automatic frequency control (AFC) is described in more detail below. However, it will be shown that AFC requires a coarse control and a fine control. The fine control is dependent upon measuring the phase difference (first difference) between two adjacent continual pilot signal samples, whereas the coarse control requires the determination of rate of change of phase (or second difference) i.e., the difference between two consecutive phase differences between adjacent samples.

BRIEF DESCRIPTION OF THE DRAWINGS

A preferred embodiment of the invention will now be described with reference to the accompanying drawings, in which.

DESCRIPTION OF THE PREFERRED EMBODIMENT

The preferred embodiment of the present invention comprises a front end for digital terrestrial television transmitted according to the DVB-T specification. The front end consists of two separate components. First, an analog down-converter that converts the input signal from UHF to a low IF. Second, an integrated circuit chip that accepts the analog signal from the down-converter and performs the required DSP operations, which include synchronization and demodulation, to form a stream of soft decisions suitable for presentation to an FEC decoder Forward Error Correction decoder).

Full compliance to the DVB-T specification means that the chip is capable of decoding signals transmitted in the following modes:

1) A signal that contains either 1705 or 6817 active carriers, commonly referred to as 2 K and 8 K respectively. The chip includes the functionality and memory required to perform the FFT algorithm in both modes.

2) Non-hierarchical QPSK, 16-QAM and 64-QAM constellations.

3) Hierarchical 16-QAM and 64-QAM constellations, either uniform or non-uniform with the possible scale factors $\alpha=2$ and $\alpha=4$.

4) Guard intervals ¼, ⅛, 1/16 and 1/32 of the OFDM symbol length.

5) Viterbi code rates ½, ⅔, ¾, ⅚ and ⅞.

Figure 1:
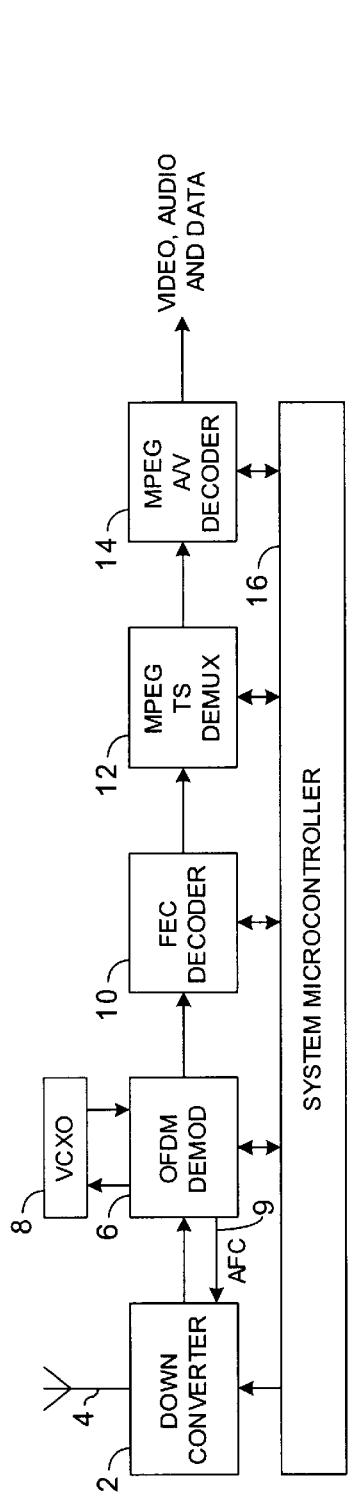
FIG. 1 is a schematic block diagram of a digital terrestrial front end converter incorporating the present invention.

Referring now to FIG. 1, a block diagram of the front end system, a down-converter 2 receives the input UHF broadcast signal from an antenna 4 and converts the carrier signal to a first IF frequency of 30–40 MHz and then to a second IF frequency of 4.57 MHz. Since the bandwidth of the modulated data is about 7.6 MHz, this second IF signal is sufficiently low in frequency to present the signal as a base band signal to a demodulator chip 6. Demodulator chip digitises the incoming signal at a rate determined by a voltage controlled oscillator 8, and provides an Automatic Frequency Control on a line 9 to down-converter 2. The output of demodulator 6 represents demodulated data and is fed to a FEC decoder 10 (Forward Error Correction or Viterbi decoder) for recovering the data. The decoded data is fed to a transport stream demultiplexer 12 and then to an audio-visual decoder 14. The front end is controlled by a system microcontroller 16.

Figure 2:
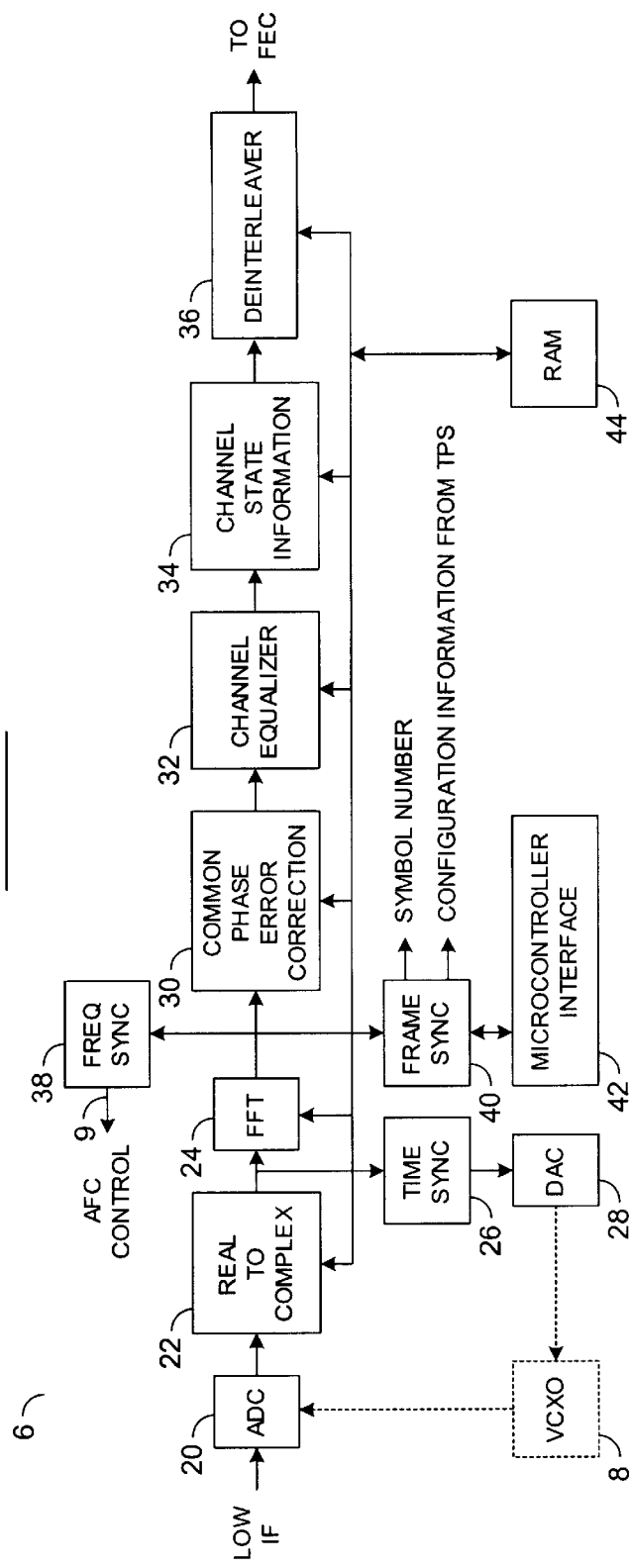
FIG. 2 is a more detailed block diagram of demodulating apparatus according to the invention forming part of the converter of FIG. 1.
Figure 3:
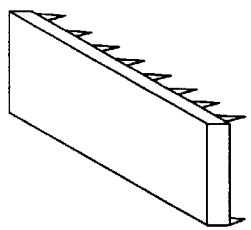
FIG. 3 is a schematic view of a chip incorporating the apparatus of FIG. 2.

Referring now to FIG. 2, this shows the demodulator chip 6 in more detail. The chip itself is shown schematically in FIG. 3. The low second IF is fed to an analog digital converter which samples the IF signal at a frequency of 18.29 MHz (×4 the second IF frequency of 4.57 MHz), in an analog to digital converter 20. The digital output samples are fed to a real to complex converter 22 which converts the digital samples to complex number values in order to provide a complex signal centred on zero frequency. This signal is fed to a Fast Fourier Transform device (FFT) 24 and to a timing synchronisation unit 26 which derives a value from the complex input signal which is fed to a digital to analog converter 28 to supply an analog control voltage to a voltage controlled oscillator 8, which provides a sampling clock signal to analog to digital converter 20.

The FFT device 24 has four modes of operation. Firstly, it is capable of performing either a 2048 point or an 8192 point transform. Second, it is capable of performing the transform in either direction. The inverse FFT functionality is provided so that the integrated circuit may be used in applications requiring OFDM modulation. In any event, the FFT performs a series of discrete Fourier transforms on each carrier frequency to provide at an output the data symbols for each carrier frequency. These output signals are corrected in phase at a common phase error generator unit 30 and then passed to a channel equaliser 32, a channel state information correction unit 34 and a deinterleaver 36. The signal thus processed is then passed at an output from the demodulator to forward error correction unit 10. The phase error correction block 30 calculates the common phase error of the signal and applies the necessary correction. The channel equaliser 32 first performs linear temporal equalisation followed by frequency equalisation using a high order interpolating filter. The equaliser outputs an equalised constellation to the channel state information unit 34. Unit 34 generates 3 or 4 bit soft decisions which are suitable for presentation to a Viterbi decoder. Deinterleaver 36 performs firstly symbol deinterleaving followed by bit deinterleaving.

In addition, the output signals from FFT 24 are passed to a frequency synchronisation unit 38 which converts it to a control signal for automatic frequency control, which acts upon a local oscillator in down-converter unit 2 for adjusting the frequency of the first or second IF.

In addition, the output of FFT 24 is fed to a frame synchronisation unit 40 whose outputs are fed forward to units 10, 12 and 14 (FIG. 1). A microcontroller interface 42 is provided, and in addition RAM memory 44 is provided to which all the units 22, 24, 30, 32, 34 and 36 have access to in order to provide their required operations.

Channel Impairments

The front end architecture of FIG. 1 must provide the best possible performance under actual operating conditions. There are several key types of channel impairments that the front end must be adept at dealing with, as follows:

1) Adjacent analog television signals. In multi-frequency networks OFDM signals may be transmitted in adjacent channels to PAL signals that could be 30 dB higher in power. Therefore, special care must be taken when designing the IF filtering scheme in the down-converter, in particular by providing a high pass filter for the second IF having a stop band from 0 Hz to a certain higher frequency.

2) Co-channel analog television interference. This will be particularly significant in interleaved frequency networks.

3) Delayed signal interference, either due to reflections from natural obstacles, or created by the network itself as is the case with single frequency networks. Such interference causes frequency selective fading which may completely erase, or significantly affect the reliability of, the bits of information carried by some of the OFDM carriers. This is compensated for in Channel State Information block 34.

4) Narrow-band interference coming from intermodulation products due to non-linearities in the transmission chain may also corrupt the bits of information carried by some of the OFDM carriers but in a different way from the frequency selective fading.

5) Co-channel interference from artificial sources such as radio microphones operating in the UHF frequency.

6) and of course thermal noise, as is present in every transmission system.

The down-converter 4 must cope with the specific requirements of COFDM whilst operating in the channel conditions described above. This means:

1) The IF must ensure the proper rejection of adjacent channel analog television signals.

2) The gain distribution must preserve linearity in order not to create intermodulation products between the OFDM carriers, thus creating a self-interference effect on the signal, and 3) The synthesiser phase-noise characteristics must be compatible with 64-QAM operation.

Memory Budget

A significant problem for demodulator integrated circuit 6 is the amount of RAM 42 that the chip requires.

TABLE 1

| Architecture component | Proportin of RAM used % RAM |
|---|---|
| Timing synchronisation | 6% |
| Frequency synchronisation | 11%/20% |
| FFT | 34% |
| Common phase error correction | 11%/0% |
| Channel equalisation | 25% |
| Channel State Information | 4% |
| Deinterleaver | 11% |

It is necessary to make the best possible use of the RAM. Some of the blocks of memory, such as the FFT and symbol deinterleaver, require fixed amounts of RAM and it is not possible to reduce them (except by reducing the word widths and so degrading the performance). Other blocks, for example, the timing synchronisation, required some algorithmic algorithmic alterations for the sole purpose of reducing the amount of memory but without degrading the performance. A technique that is employed to make best use of the available memory is to "reuse" some of the memories. The data delay required to implement AFC and common-phase-error correction doubles as the first data delay in the channel equalizer. This means that only two additional data delays were required to implement full linear temporal equalization.

Table 1 shows the final allocations of RAM that were made in the chip. As this table shows, the highest memory usage is in the FFT circuitry and the smallest is in the timing synchronization circuitry.

Analog Versus Digital AFC

One of the processes that is required in the synchronization of the demodulator is to obtain frequency synchronization. There is a choice as to whether to apply the required frequency shift as an analog correction in the down-converter 2, or as a digital frequency shift in the demodulator chip.

Analog Frequency Correction

If the frequency correction is implemented by adjusting the frequency of the reference crystal in the down-converter 2, then a control signal on line 9 is provided from the output of the integrated circuit 6 back to the down-converter. This method has the advantage that a SAW filter inside the down-converter can be made as narrow as possible. The disadvantages are twofold. First, the integrated circuit must pass a control signal back to the down-converter. Second, the architecture of the down-converter is made more complicated since the control signal must adjust the reference crystal within the search range of the AFC.

Digital Frequency Correction

If the frequency correction is implemented in the integrated circuit 6, then the architecture of the down-converter 2 is made much simpler since there is no longer any need to have a control signal from the chip 6, and the loop in the down-converter that drives the reference crystal is no longer required. The disadvantage of this method is that the bandwidth of the SAW filter must be increased by the AFC search range. This causes a significant penalty in terms of the adjacent channel protection ratio when the receiver is used in an environment where the existing analogue services are operated in adjacent channels to digital services. The architecture described will permit both analog and digital correction.

Temporal Response Versus Noise Averaging in Channel Equalizer 32

The signal from the FFT is affected by all the impairments caused by the channel; for example, in the presence of a single echo, the FFT output will suffer from frequency selective fading. The purpose of the channel equalizer 32 is to rotate and scale the constellation so that the constellations on all the carriers are of a known size (but not necessarily of the same reliability). The process is performed by using the scattered pilot information contained in the COFDM signal. The scattered pilots provide a reference signal of known amplitude and phase on every third OFDM carrier (see FIG. 11, sec 4.5.3, ETS 300 744, ETSI November 1996). Since this scattered pilot information is subject is subject to the same channel impairments as the data carriers, the scattered pilots are noisy.

In the present invention, temporal linear interpolation is performed between two received scattered pilots, and these interpolated values are used as the reference for frequency equalization of the data. Since scattered pilots at the same time duration are spaced 4 OFDM symbols apart, a compensating data delay of 3 OFDM symbols must be provided to permit this option.

Common Phase Error Correction Versus Down Converter Performance

The down converter performance has a different set of requirements from those demanded by down-converters suitable for analog television. For example, in a down-converter for analogue television, particular attention must be given to the group delay-characteristics. However COFDM has been specially designed to be robust to this type of distortion, and so the group delay is much less important.

Another difference between the two requirements is in the local oscillator phase noise performance. The addition of local oscillator phase noise to an OFDM signal has two principal effects:

1) To rotate the received constellation by an amount which is the same for all carriers within one OFDM symbol, but varying randomly from symbol to symbol. This is called the common phase error (CPE) and primarily results from the lower-frequency components of the phase-noise spectrum; and 2) To add Inter-Carrier Interference (ICI) of a random character similar to additive thermal noise. ICI primarily results from the higher frequency components of the phase-noise spectrum. ICI cannot be corrected and must be allowed for in the noise budget. It can be kept small in comparison with thermal noise by suitable local oscillator design.

It is possible to remove the common phase-error component caused by phase noise added in the down-converted by digital processing in the chip. This processing is performed by the common-phase-error correction block 30.

The common-phase-error correction block 30 is able to remove the common phase error because all carriers within a given symbol suffer the same common phase error. By measuring the continual pilots, whose intended phase is the same from symbol to symbol, the common phase error is determined and then subtracted from the phase of all the data cells in the same symbol. There are sufficient continual pilots (which in any case are transmitted with a power approx. 2.5 dB greater than data cells) that the effect of thermal noise on this measurement can be rendered negligible by averaging.

There are essentially three components required to implement common-phase-error correction in the chip. These are:

1) A complex symbol data delay; since the common phase error varies randomly from symbol to symbol, it must be applied to the symbol from which it was calculated. Furthermore, it is not possible to calculate the common phase error until the whole symbol has been received.

2) The digital circuitry required to calculate the common phase error based on the received data.

3) A phase-to-complex-number look-up table. This is required since the common phase error value that is calculated will be a phase value. In order to apply the correction to the signal, the signal must be multiplied by a complex number equal to the complex representation of the phase.

These three factors, which together form the "cost" of implementing the feature on the chip, must be balanced against the cost of improving the performance of the down-converter so that the phase-noise it introduces is negligible.

Common phase error correction is in practice combined with generation of the control signal in unit 38 for automatic frequency control. Both measurements are based on the phase rotation between one symbol and the next, measured on the continual pilots (CP's).

If a constant AFC error is present, there will be a constant change of rotation between successive symbols, proportional to the frequency error. Low frequency phase-noise will have a similar effect; rotating all of the carriers by the same angle, but this angle will vary from symbol to symbol in a random manner. In both cases it is desirable to attempt to correct the phase error on the current symbol by applying the opposite phase rotation to all carriers—this process is known as common-phase-error correction.

In addition to the phase rotation effect, an AFC error will also cause inter-carrier interference (ICI) which cannot be corrected for—for this reason it is also necessary to feed back an error signal to drive the frequency error to zero. This error signal can be applied to either in the analog domain as the local-oscillator control voltage, or in the digital domain to a DDFS which must be situated before the FFT. In either case an appropriate loop filter is included.

The measurement of phase rotations can only resolve AFC errors of up to roughly one half of the carrier spacing in either direction. In practice, during acquisition the AFC error is likely to be much greater than this. For this reason the AFC measurement also includes a "coarse" part, which measures the number of whole carriers by which the frequency is wrong. This is done using a pattern-matching approach looking for continual pilots.

The frequency offset is divided in two parts.

1) Coarse Frequency Offset: A multiple of the carrier spacing

2) Fine Frequency Offset: A frequency offset less than the carrier spacing.

The OFDM signal is formed with a group of four different types of carriers, which are data carriers, continual pilots, scattered pilot and TPS pilots. Their positions are well defined by DVB-T specification. The continual pilots are always transmitted at the same position from OFDM symbol to OFDM symbol, for each OFDM symbol, continual pilots transmit exactly the same known information (see Table 9, sec 4.5.4, ETS 300744, ETSI November 1996).

A fixed frequency offset rotates all carriers with the same phase from symbol to symbol. Therefore, the first phase difference between two carriers at the same index k belonging to two consecutive OFDM symbol gives the amount of frequency offset modulo π. This can be shown as follows:

Symbol m, with N carries, on a frequency $F_0$ lasting $T_T$ with a carrier spacing of $w_s$ may be written:

$$s(t) = \sum_{k=0}^{N-1} R_{k,m} e^{j(w_0 t + kw_s(t - mT_T))} \quad mT_T < t < mT_T + T_s \quad (1)$$

The symbol is assumed to be integrated on Ts whereas it is sent through the Channel during $T_T = T_s + T_{Guard}$. Assuming a frequency offset of $\Delta w_0 = nw_s + \delta w_0$, the l output of the FFT equals:

$$Y_{l,m} = \frac{1}{T_s} \int_{mT_T}^{mT_T + T_s} r(t) e^{-j((w_0 + \Delta w_0)t + lw_s(t - mT_T))} dt \quad (2)$$

Which gives for carrier 1 of symbol m $$Y_{l,m} = \underbrace{e^{-j\delta w_0 T_s/2} \cdot e^{-j(nw_s + \delta w_0)mT_T}}_{\text{Constant Phase Rotation}} \underbrace{\sum_{k=0}^{N-1} R_{k,m} (-1)^{(k-l-n)} \text{sinc}(k - l - n - \delta w_0/w_s)}_{\text{Inter Carrier Interference Term}}$$

Phase difference for each carrier between consecutive symbols: $\phi = e^{-j(nw_s + \delta w_0)T_T}$.

Thus, all carriers are rotated with the same phase from symbol to symbol. It is possible to derive the first phase difference by providing a one symbol delay, and measuring the phase difference in a continual pilot between adjacent symbol time intervals.

As continual pilots always carry the same information, then this difference is constant with time. Therefore, the second difference (the difference of the difference) shall be zero for all continual pilots, and random values for all carriers (as data on these carriers are changing from symbol to symbol).

Applying the second phase difference, (the difference of the difference between two consecutive symbols at carrier index k) should lead to a pull phase value whatever the frequency offset is. For all the carriers that are not continual pilots, this value shall be a random value. It is possible to determine the second phase difference by providing two symbols delay, so as to measure two phase differences in a continual pilot between adjacent symbol intervals. Thus, the difference between the two phase differences is determined to provide the second phase difference.

Each OFDM symbol carries 2 k or 8 k carriers. Continual pilots (45 or 177) always lie at the same index and are spaced roughly 40 carrier intervals apart (from 0 to 2047 or 0 to 8191). Therefore, knowing the theoretical positions of the continual pilots, it is possible to search around the theoretical positions of the continual pilots to locate these zeros in second difference in phase.

To achieve this, a bank of recursive filters is employed that accumulates the phase difference for each carrier around the theoretical position for a continual pilot signal.

Figure 4:
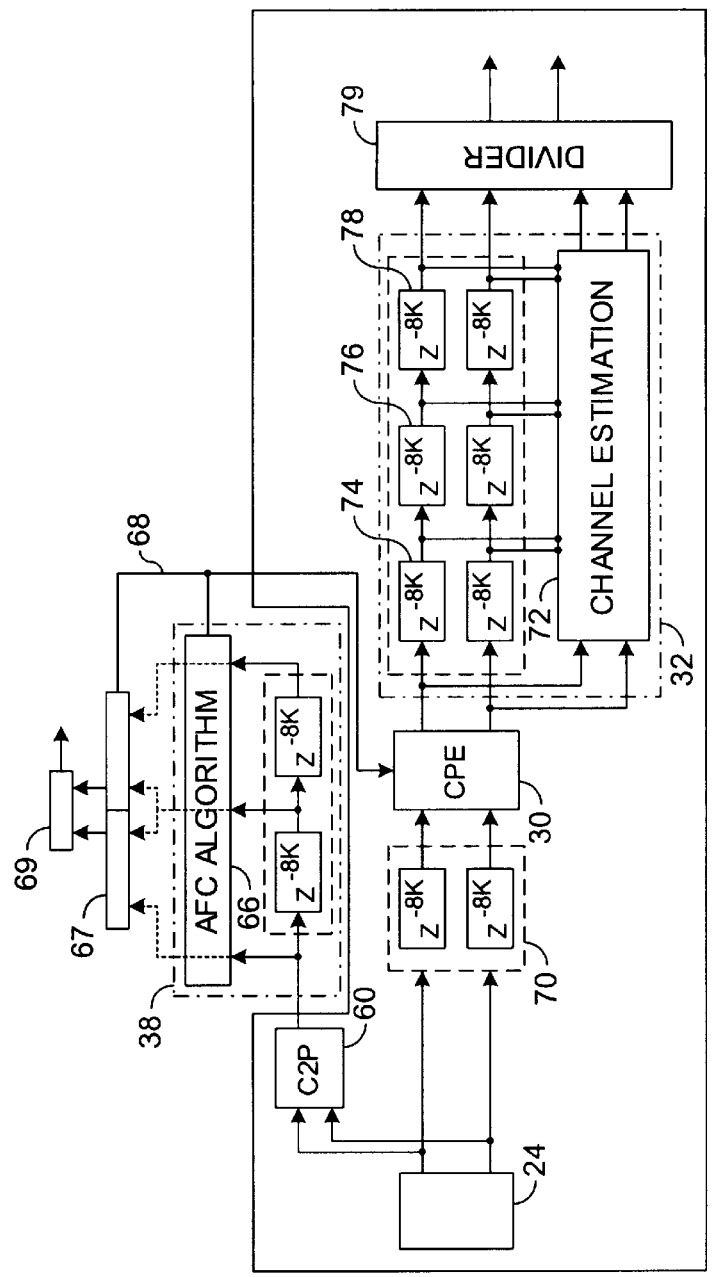
FIG. 4 is a block diagram of one method, not preferred, of automatic frequency control/common phase error/channel equalization estimation and recovery.

Referring now to FIG. 4, this shows one method of implementing Automatic Frequency Control (AFC), Common Phase Error (CPE) correction and Channel Equalization (CE) on an incoming signal so that the three processes are sequentially executed, independently of the other. Hence, after acquiring AFC lock, CPE is corrected, and then the Channel is Equalized. CPE corrections must be carried out prior to CE, as rapid variations introduced by the common phase error cannot be handled in the channel equalization.

A signal output from FFT device 24, comprising data symbols for each carrier frequency, in complex number format, is converted to a phase angle value in C2P converter unit 60 and then fed to AFC unit 38. The phase signals are applied to first and second delay elements 62, 64, each comprising 8 K of real memory—required for the various carrier frequencies to store two adjacent OFDM symbols. Continual pilot signals from the inputs and outputs of delay elements 62, 64 are provided to process unit 66 in order to derive phase error signals (first difference) in subtractors 67, for determination of fine frequency error. In addition, the difference (second difference) between the phase error signals is determined in a subtractor 69 for determination of coarse frequency error. The phase error (first difference) is applied on line 68 to common phase error correction unit 30. Because the phase error on line 68 can only be provided after one symbol delay, it is necessary to provide a corresponding delay at the input of the CPE. CPE correction is carried out on the complex symbol from FFT 24, and a delay element 70 comprising 8 K of Complex memory (16 K of real memory) is provided at the input of CPE unit 30. Thus, delay element 70 has 8 K of real memory for storing the real part of the complex symbols, and 8 K of real memory for storing the imaginary part of the complex symbols. The output from CPE unit 30 comprising symbols in complex format being corrected for common phase error, is applied to channel equalization unit 32. Channel estimation is carried out in unit 72, and the process, employing linear temporal interpolation on scattered pilots requires three symbol delays as explained above. Three 8 K complex memories as delay units 74, 76, 78 are therefore provided. A divider 79 divides the symbol values by the estimated equalization factor.

In this implementation, ten 8 K real memories are required, i.e. 800 K bits. This is an excessive amount of memory, bearing in mind that the chip may only contain 1 Mbit of memory.

Figure 5:
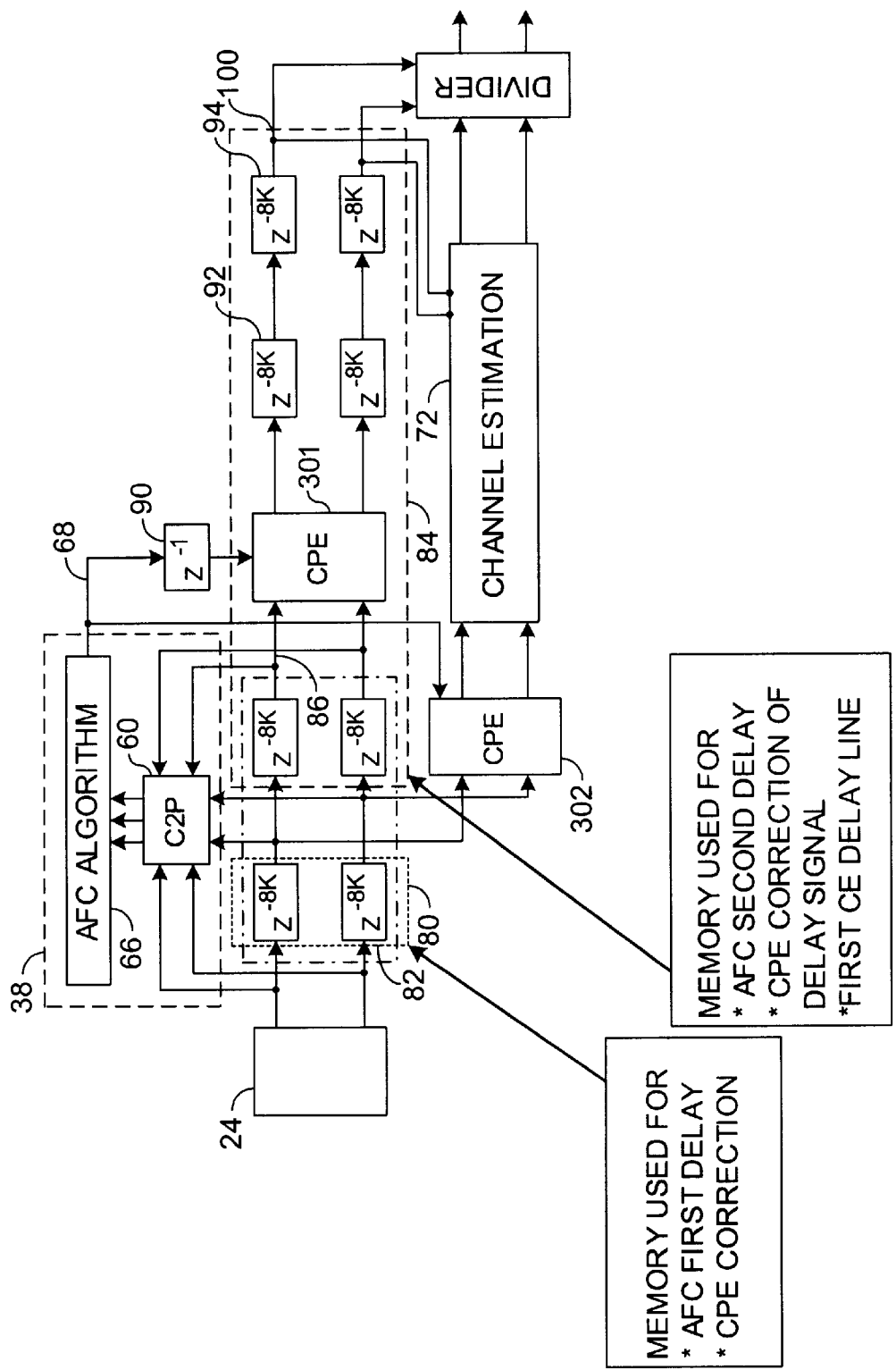
FIG. 5 is a schematic block diagram of a preferred embodiment of the invention for automatic frequency control, common phase error correction and channel equalization.

In a preferred embodiment of the invention therefore, as will now be described with reference to FIG. 5, the memory requirement is reduced. The embodiment of FIG. 5 is formed in an ASIC, and it is therefore possible to mix different blocks of the ASIC so that they share the same memory for different processes. In addition, in an ASIC it is possible to increase the clock speed, so that ASIC block speeds can be increased to perform more operations on the incoming data. In FIG. 5, similar elements to those of FIG. 4 are denoted by the same reference numerals. Data symbols in complex number format from FFT 24 are fed to first and second delay elements 80, 82, each comprising 8 K of complex memory (16 K bits), and thence to a common phase error correction unit 301. Tappings 84 provide one element delayed symbols to a further CPE unit 302 and provide the continual pilot values to a complex to phase angle converter C2P unit 60. Unit 60 also receives continual pilot values directly from the output of FFT 24, and from tapping 86 of delay elements 82. The output of C2P unit 60 is applied to AFC unit 66 for determination of first and second phase differences. The output of unit 60 on line 68, representing the first phase difference or common phase error, is applied directly to CPE unit 302 and, via a delay element 90, to CPE unit 301. The output of CPE unit 301 is applied to third and fourth delay elements 92, 94, each comprised 8 K of complex memory, tapping points 100 being connected to Channel Estimation unit 72. The output of CPE unit 302 is applied directly to CE unit 72.

In operation, the AFC is first executed, requiring inputs from FFT 24, and tapping points 84, 86. Three sets of data are thus applied to C2P unit 60, as compared with a single set of data in FIG. 4. This issue is solved by increasing the clocking speed of C2P unit 60 by a factor of 4. The common phase error provided on line 68 is applied to CPE unit 302, which applies a corrected version of the data symbols, delayed by delay elements 80, to the input of CE unit 72. In addition, CPE unit 301 receives the common phase error signal, delayed by one symbol interval in unit 90, and applies a phase error correction to symbols from delay elements 80, 82, which are thus delayed by two symbol intervals. The corrected symbols output from CPE unit 301 are applied directly to CE unit 72 via tappings 96, and from delay elements 92, 94 via tappings 98, 100. It may thus be seen CPE units 301, 302 and delay elements 80, 82, 92, 94, provide an equivalent function to CPE unit 30 and memory elements 70, 74, 76 and 78 of FIG. 4. Using a clock having a faster rate of ×4 accommodates the problem that the arrangement of FIG. 5 employs a larger hardware over head.

The overall impact is that instead of having 10 Real memories, only 8 are required. Therefore, the gain is of 20%, or in terms of number of bits, it is a 160 Kb saving. Therefore, by applying such memory sharing, the overall memory size requirement for the chip is currently significantly reduced.

It is possible to reduce again significantly the memory size by looking in more depth into the OFDM ETSI specification.

Focusing on the 8 K mode, as this is the most stringent, in the 8 K mode, the FFT generate 8192 complex carriers for each OFDM symbols. However, only 6817 out of them are used by the transmitter, the remaining ones being set to 0, to ensure correct interference immunity. Therefore, an 8 Kb memory is not needed, only 6817. On top of that, and with reference to the ETSI specification, among the 6817 carriers, only 6048 carriers transport Data. The remaining carriers are there to help the receiver. Therefore, the result of the equalizer is only interesting for 6048 carriers out of 6817. Therefore, one should only store the useful data for 6048 carriers in the channel equalizer delay line.

Finally, here is what is needed:

4 Memories of 6817×10 bits=272680 bits of storage

4 Memories of 6048×10 bits=241920 bits of storage

We then need 514.6 kb of memories, instead of the original 800 kb. Which gives a saving of 37%.

What is claimed is:

1. An apparatus for demodulating a digital video broadcast signal comprising data modulated on a multiplicity of spaced carrier frequencies, comprising:
    a transform device for analyzing the digital video broadcast signal to provide a series of symbol values for each of the multiplicity of carrier frequencies;
    an automatic frequency control device for controlling the frequency of the series of symbol values in dependence on a common phase error signal from the series of symbol values;
    a first and second delay coupled in series to receive the series of symbol values from said transform device and configured to derive a common phase error signal from the series of symbol values;
    a first and second common phase error correction (CPE) device for receiving the common phase error signal, for correcting the series of signal values from said transform device an output of the first delay being applied to the first CPE device and an output of the second delay being applied to said second CPE device;
    a channel equalization device for compensating for communication channel impairments for receiving directly an output from said first CPE device; and
    a third and fourth delay connected in series and connected to receive an output from said second CPE device and applying delayed versions of the same to said channel equalization device.

2. An apparatus as claimed in claim 1, wherein said third and fourth delays are arranged to exclude pilot signals and to include only data symbols.

3. An apparatus as claimed in claim 1, wherein said first and second delays are further configured to convert said symbol values to a phase format and provide the same to the derived common phase error signal.

4. The apparatus according to claim 1, wherein said digital video broadcast signal is down converted in a first and a second stage, said first stage configured to down convert said digital video broadcast signal to a first frequency and said second stage configured to down convert said digital video broadcast signal to a second frequency.

5. The apparatus according to claim 1, wherein said channel equalization device is further configured to provide channel equalization and determine a contribution of each of one or more channels by a derived channel state instruction.

6. The apparatus according to claim 1, wherein said common phase error signal comprises a random component and a common component.

7. The apparatus according to claim 1, wherein said transform device is further configured to provide timing control to ensure a timing window for a transform operation is correctly positioned in relation to waveforms of said digital video broadcast signal.

8. The apparatus according to claim 1, wherein said transform device is further configured to apply a complex signal value of the digital video broadcast signal to a time synchronization circuit and an output of the time synchronization circuit is converted in a digital to analog converter to an analog value, wherein the analog value is configured to control a voltage controlled oscillator.

9. The apparatus according to claim 1, wherein said automatic frequency control device is further configured to maintain a demodulation process in synchronization with down conversion to reduce phase error in one or more recovered signals.

10. The apparatus according to claim 1, wherein said transform device is configured to subsequently derive a feedback signal from the digital video broadcast signal, wherein the feedback signal is fed to a local oscillator in order to maintain frequency synchronization.

11. The apparatus according to claim 1, wherein said automatic frequency control device implements a coarse and a fine control.

12. The apparatus according to claim 11, wherein said fine control is dependent upon a first difference between a first and a second adjacent continual pilot signal sample and said coarse control is dependent upon a second difference between a first and a second consecutive phase difference between adjacent samples.

13. An apparatus for demodulating digital video broadcast signals comprising data modulated on a multiplicity of spaced carrier frequencies, comprising:
    down-conversion means for converting an input broadcast signal to a frequency sufficiently low to enable analog-to-digital conversion of the signal;
    analog-to-digital conversion means for converting the broadcast signal to a series of digital samples;
    real-to-complex conversion means for converting each digital sample to a complex number value;
    Fourier transform means for analyzing the complex number values to provide a series of symbol values for each carrier frequency;
    automatic frequency control means, comprising means responsive to the output of said Fourier transform means for producing a signal for controlling the frequency of the signal formed by the complex number values, in dependence upon a common phase error signal in the series of symbol values, first and second delay means coupled in series to receive the series of symbol values from said transform means, and for providing delayed versions to said automatic frequency control means;

first and second common phase error correction (CPE) means for receiving said common phase error signal, for correcting said symbol values from said transform means, the output of the first delay means being applied to the first CPE means and the output of the second delay means being applied to said second CPE means;

channel equalization means for compensating for communication channel impairments for receiving directly the phase error corrected signals from said first CPE means; and third and fourth delay means connected in series and connected to receive the output from said second CPE means and applying delayed versions of the same to the channel equalization means.

14. An apparatus as claimed in claim 13, wherein said third and fourth delay means are arranged to exclude pilot signals and to include only data symbols.

15. An apparatus as claimed in claim 14, including means for deriving from symbol values in the first and second delay means a common phase error signal.

16. An apparatus as claimed in claim 15, including means, coupled between the first and second delay means and the common phase error deriving means, for converting the symbol values from a complex format to a phase format.

17. An apparatus as claimed in claim 13, including means for deriving from symbol values in the first and second delay means a common phase error signal.

18. An apparatus as claimed in claim 17, including means, coupled between the first and second delay means and the common phase error deriving means, for converting the symbol values from a complex format to a phase format.

19. A method for demodulating a digital video broadcast signal comprising data modulated on a multiplicity of spaced carrier frequencies, the method comprising:

analyzing the broadcast signal to provide a series of symbol values for each of the multiplicity of carrier frequencies;

automatic frequency control of the frequency of the series of symbol values in dependence on a common phase error signal from the series of symbol values;

deriving a common phase error signal from symbol values in first and second delay means coupled in series to receive the series of symbol values;

common phase error correcting the output of the first delay means and common phase error correcting the output of the second delay means;

compensating the phase error corrected signals from the first delay means for communication channel impairments by channel equalization; and delaying the phase error corrected signals from the second delay means in third and fourth delay means connected in series to receive the signals and applying delayed versions of the same to effect the channel equalization.

20. A method for demodulating digital video broadcast signals comprising data modulated on a multiplicity of spaced carrier frequencies, the method comprising:

converting an input broadcast signal to a frequency sufficiently low to enable analog digital conversion of the signal;

analog-to-digital conversion of the broadcast signal to a series of digital samples;

converting each digital sample to a complex number value;

analyzing the complex number values to provide a series of Fourier transform symbol values for each carrier frequency;

automatic frequency control responsive to the output of said Fourier transform symbol values for producing a signal for controlling the frequency of the signal formed by the complex number values, in dependence upon a common phase error signal in the series of symbol values;

providing for the automatic frequency control delayed versions of the series of symbol values using first and second delay means coupled in series;

first and second common phase error correction (CPE) means for receiving the common phase error signal;

common phase error correcting the output of the first delay means and common phase error correcting the output of the second delay means;

compensating the phase error corrected signals from the first delay means for communication channel impairments by channel equalization; and delaying the phase error corrected signals from the second delay means in third and fourth delay means connected in series to receive the signals and applying delayed versions of the same to effect the channel equalization.

* * * * *